Dec. 27, 1960   J. KMIECIK   2,966,000
LINE CLIP
Filed March 3, 1959

INVENTOR
JOSEPH KMIECIK

BY
Wright & Wright
ATTORNEYS

# United States Patent Office 2,966,000
Patented Dec. 27, 1960

2,966,000

LINE CLIP

Joseph Kmiecik, 3744 S. 20th St., Milwaukee, Wis.

Filed Mar. 3, 1959, Ser. No. 796,798

1 Claim. (Cl. 43—44.88)

This invention appertains to line clips and fasteners and more particularly to a novel means for adjustably connecting a fishing line in different manners to the base of a fishing float or bobber. This application is a continuation in part of my application S.N. 640,261, filed February 14, 1957, which prior application is abandoned in favor of the present application.

One of the primary objects of my invention is to provide a line clip or fastener especially adapted for use with a fishing bobber having a novel construction and arrangement whereby the line can be connected to the bobber in different selected manners, so as to suit different fishing conditions or different modes of fishing, the line in one instance being held by the clip with a friction grip, so that the bobber can slip on the line when the line is being reeled in; the line in another instance being held locked by the clip in a selected position against slipping movement.

Another salient object of my invention is to provide a line clip having a bent back resilient gripping finger and a flat resilient surface engaging gripping finger, the line being adapted to be sprung under the fingers in different ways, the flat finger also constituting a line wrapping member to hold the line locked in place, the flat finger having on its oposite edges line receiving notches whereby to prevent slipping of the line on the flat finger when the line is turned around said finger.

A further important object of my invention is the provision of providing the fingers with novely positioned struck out tits for preventing the line from slipping longitudinally under the fingers and off of the bobber.

A still further object of my invention is to provide a line clip on a bobber including a flat attaching base plate having formed thereon novely arranged line engaging clip fingers, so that the line can be readily slipped thereunder and thereover, in such a way that pull on the line in any direction will not displace the line from the float body.

A still further important object of my invention is to provide a fishing bobber of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed, and illustrated in the accompanying drawing, in which drawing:

Referring to the drawing in detail, wherein similar reference characters designate corresponding parts throughout the several views, the letter C generally indicates my improved clip and B a bobber with which the same can be associated.

Figure 1:
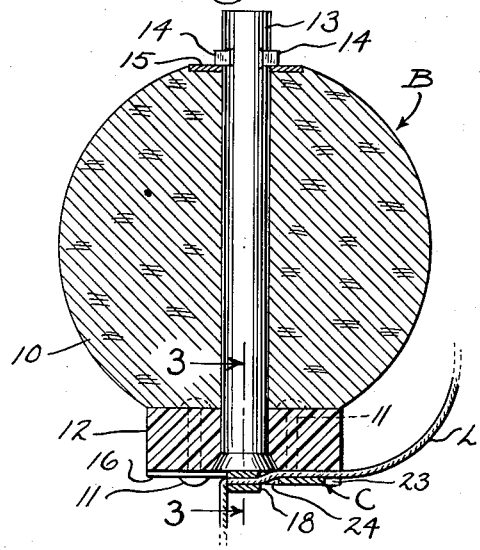
Figure 1 is a central vertical sectional view through my improved line clip showing the same attached to a bobber, the section being taken on the line 1—1 of Figure 2, looking in the direction of the arrows.

The bobber B can be of any preferred shape and character providing the same has a flat lower surface, for a purpose which will later appear. As illustrated in the drawing, the bobber B includes a buoyant body 10 having attached to its lower end by fastening elements 11, a cylindrical block 12. The block 12 can be secured in various manners to the buoyant body 10, but as illustrated, a headed rod 13 is passed through the block 12 and axially through the buoyant body. A washer 14 can be slipped over the upper end of the rod 13 against the upper end of the body and the rod can be upset as at 15, to hold the washer and consequently, the rod and block in place.

My novel clip C is preferably fabricated from flat resilient sheet metal having a shape of substantially three quarters of a circular disc. The clip includes a flat attaching base plate 16 having openings 17 formed therein for the reception of the fastening elements 11. The base plate 16, itself, is substantially a half of a circle. The forward straight edge of the base plate, at a point substantially equidistant its ends is provided with a bent back clip finger 18. This clip finger overlies and is in contact with the base plate. The finger has struck down therefrom a tit 19, which intimately contacts the base plate and prevents a line riding from under this finger. If desired, the extreme outer end of the finger can be slightly upturned to facilitate the sliding of a fishing line (as will later appear) under the finger and on the base plate.

Formed on the same edge of the base plate 16 as the finger 18, but at one side of the finger 18 and forming a continuation of the base plate, is a flat line gripping finger 20. This finger 20 is of a quadrant shape and gradually tapers toward its outer end to provide a leading point 21 and this point is slightly upturned as at 22, to facilitate the threading of a line thereunder. The opposite edges of the finger 20 adjacent to the base plate, have formed therein line receiving notches 23 and 24. When the base plate 16 is firmly secured to the flat lower face of the block 12 by the fastening elements 11, the clamp finger 20 lies against and in intimate contact with the flat face, and this is important as will now appear. The finger 20 is also provided with a struck down tit, 25 which intimately contacts the block 12 so as to prevent the accidental displacement of a line from under the finger.

With the float body in its formed condition, and the clip attached thereto, the float is now ready for use and the line can be connected to the float by the clip in different manners to suit varying fishing conditions and different modes of fishing.

Figure 2:
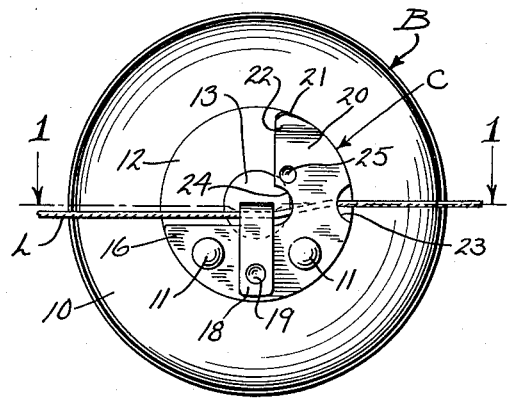
Figure 2 is a bottom plan view of the bobber showing my clip attached thereto and illustrating one means of connecting a fish line with the clip and bobber.
Figure 3:
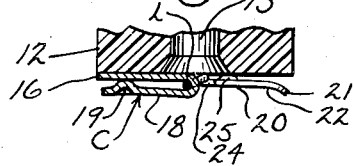
Figure 3 is an enlarged fragmentary detail vertical sectional view taken on the line 3—3 of Figure 1, looking in the direction of the arrows, the view illustrating more particularly the novel arrangement of the struck in tits for preventing displacement of the line.

In Figure 2, I have illustrated one mode of connecting a fishing line L with the bobber. The line at the desired point is grasped in the hands of the user, and the same is slipped under the fingers 18 and 20, and is frictionally retained in place by the clip finger and prevented from slipping out from under the clip finger by the struck in tits 19 and 25. In this form of connecting the line with the bobber, when a forcible pull is exerted on the line, the same can slip on the bobber and this is desirable when the bobber is used with a rod and reel. When the line is reeled in and the bobber reaches the end of the rod, the line will slip under the clip and can be further wound on the reel.

Figure 4:
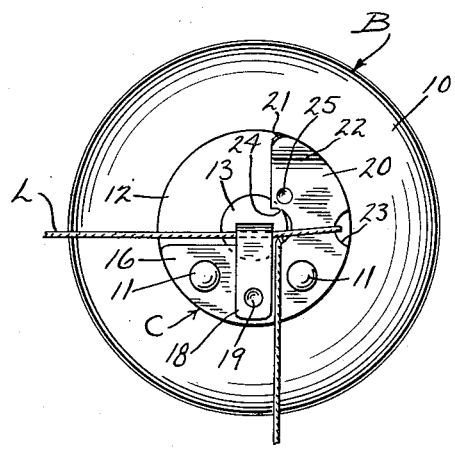
Figure 4 is a view similar to Figure 2, but illustrating another method of attaching the line to the bobber.

As shown in Figure 4, the line is grasped by the fingers of the fisherman and is slipped under the fingers 18 and 20 and is brought over and under the finger 20. This is a simple movement of the line and the line is securely held in the desired selected position and pull in any direction on the line is resisted by the clip and displacement of the line from the body is prevented.

Figure 5:
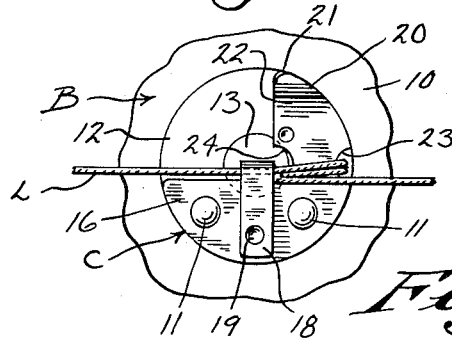
Figure 5 is a view similar to Figures 2 and 4, but illustrating a still further means of connecting the line to the bobber.
Figure 6:
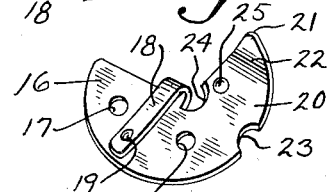
Figure 6 is a detail perspective of the clip detached from the bobber.

As shown in Figure 5, the line can be given any desired number of turns around the finger 20, and obviously, the more turns of the line, the more firmly the line will be held by the clip against slipping movement. The notches 23 and 24 receive the turns of the line and prevent slipping of these turns.

From the foregoing description it can be seen that I have provided an exceptionally simple and novel form of clip which can be effectively used with fishing bobbers.

While I have shown my clip applied to a fishing bobber, it is to be understood that the principles thereof can be applied for other line holding purposes, other than fish lines.

Changes in details may be made without departing from the spirit or the scope of this invention, but what I claim as new is:

A line holder for a fishing bobber or the like comprising a resilient clip and means for securing the clip to a flat face of the bobber and said resilient clip including a flat base plate, a line grip finger formed on the inner edge of the base plate intermediate the ends thereof and bent back over the base plate into partial contact therewith, and a flat clamp finger formed on the same edge of the base plate and projecting out from said edge in the opposite direction from the first finger, said flat clamp finger having a tapered outer edge leading toward the outer end thereof, said line grip finger and said flat finger being adapted to receive a fish line thereunder, said flat finger also constituting a means for winding a line thereabout, and said flat finger having formed on its opposite edges inwardly directed notches in transverse alignment with one another and in alignment with the bent back portion of the line grip finger whereby said line grip finger will receive a line when the line is wound about said flat finger.

References Cited in the file of this patent
UNITED STATES PATENTS

| | | |
|---|---|---|
| 798,271 | Donalds | Aug. 29, 1905 |
| 873,692 | White | Dec. 10, 1907 |
| 2,535,907 | Dolejs | Dec. 26, 1950 |